United States Patent [19]

Miyaguchi et al.

[11] Patent Number: 5,168,489
[45] Date of Patent: Dec. 1, 1992

[54] RECORDED DATA READER EMPLOYING A POLARIZED BEAM SPLITTER

[75] Inventors: Satoshi Miyaguchi; Atsushi Onoe, both of Saitama, Japan

[73] Assignee: Pioneer Electronic Corporation, Tokyo, Japan

[21] Appl. No.: 710,476

[22] Filed: Jun. 5, 1991

[30] Foreign Application Priority Data

Nov. 7, 1990 [JP] Japan .................................. 2-301650

[51] Int. Cl.⁵ .............................................. G11B 7/00
[52] U.S. Cl. .................................. 369/100; 369/44.12; 369/112
[58] Field of Search ............... 369/44.12, 44.11, 44.39, 369/100, 112, 120, 121, 122; 385/1, 2, 3, 4, 5, 6, 7, 8, 9, 10, 11, 12, 13, 14, 130

[56] References Cited

U.S. PATENT DOCUMENTS

| | | | |
|---|---|---|---|
| 4,718,052 | 1/1988 | Kono et al. | 369/44.12 |
| 4,720,824 | 1/1988 | Hayashi | 369/44.12 |
| 4,797,867 | 1/1989 | Sunagwa et al. | 369/44.12 |
| 4,859,033 | 8/1989 | Kono et al. | 369/44.12 |
| 4,862,440 | 8/1989 | Miyamoto et al. | 369/44.12 |
| 4,911,512 | 3/1990 | Yamamoto et al. | 385/14 |
| 5,070,488 | 12/1991 | Fukushima et al. | 369/44.12 |

*Primary Examiner*—Tommy P. Chin
*Assistant Examiner*—Thai Tran
*Attorney, Agent, or Firm*—Sughrue, Mion, Zinn, Macpeak & Seas

[57] ABSTRACT

A recorded data reader is provided with a light source for emitting a beam of light and with a photosensitive means. A polarized beam splitter incorporates an interface developed between a titanium diffused region and a proton exchanged region, formed by treating one region of a titanium diffused layer for proton exchange. Both regions are arranged on a substrate of lithium niobate material. Also, a collimator lens, a surface wave electrode, and a grating lens are embedded in the same substrate, thus forming a transmitting and separating arrangement, which transmits the light beam emitted by the light source and which separates a return beam of light originating from a recording medium.

12 Claims, 4 Drawing Sheets

VAPOR DEPOSITION OF TITANIUM

TITANIUM DIFFUSED LAYER

MASKING
TITANIUM DIFFUSED LAYER

TITANIUM DIFFUSED REGION
PROTON EXCHANGED REGION

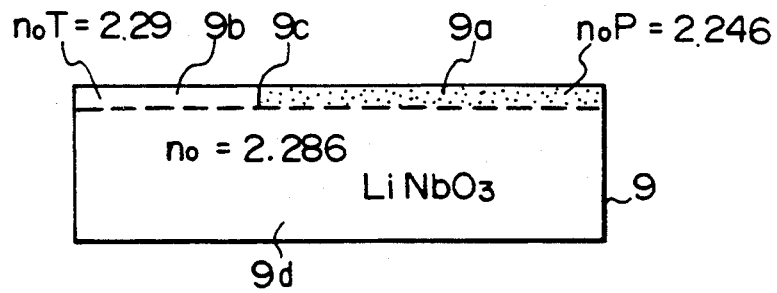
Fig. 4A
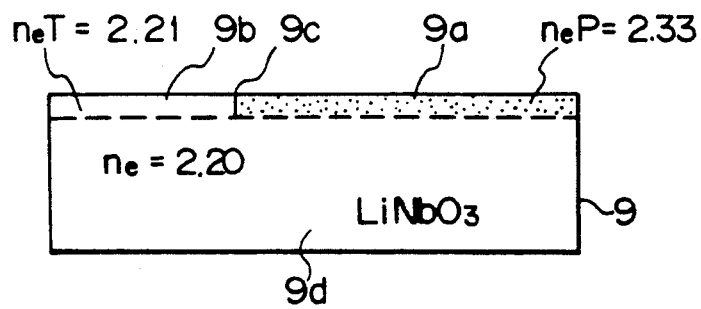
Fig. 4B
Fig. 5
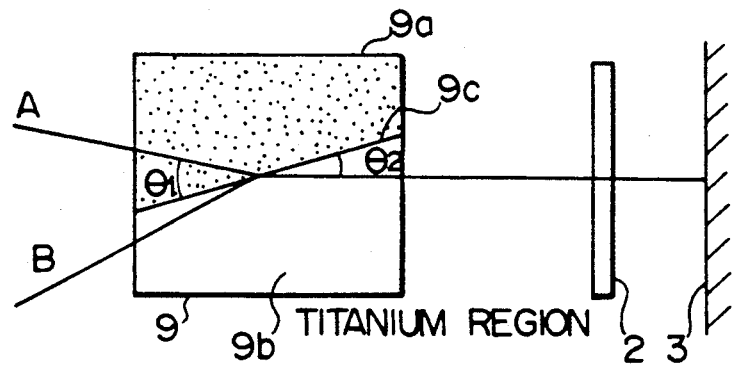

RECORDED DATA READER EMPLOYING A POLARIZED BEAM SPLITTER

BACKGROUND OF THE INVENTION

1. Field of the Invention

The present invention relates to a recorded data reader for reading out desired data from a recording medium carrying recorded data.

2. Description of the Related Art

A polarized beam splitter for transmitting one of two linearly polarized lights of which polarization planes are at a right angle to each other and for reflecting the other has widely been used as an optical splitter or a light propagation shifter provided in an optical application apparatus. Such a known polarized beam splitter is generally made of calcite or quartz, as in the case of, e.g., Wollaston prism, or may be formed by coating a common prism with a dielectric material.

FIG. 1 illustrates the arrangement of a known polarized beam splitter using prisms. As shown, a polarized beam splitter 1 consists mainly of two right-angle prisms 1a and 1b with their base sides coated with layers of dielectric material and cemented to each other with an adhesive. The prism 1 is arranged so that the cemented area 1c (referred to as a dielectric layer hereinafter) allows a linearly polarized light vibrating vertically (referred to as an S polarized light) to pass through and a linearly polarized light vibrating horizontally (referred to as a P polarized light) to reflect. Also, the dielectric layer 1c is arranged at 45° to the direction of incident of an incoming light A.

A beam of S polarized light A is introduced to pass through the prism 1 and then, through a quarter wave plate 2 prior to reflecting on a mirror 3. A reflected beam from the mirror 3 passes again through the quarter wave plate 2 and returns to the prism 1. The quarter wave plate 2 has a thickness equal to ¼ the optical path length of a propagating light thus shifting the polarization of a linearly polarized light by 90° during two pass actions. Accordingly, the reflected beam becomes a P polarized light which is reflected by the dielectric layer 1c and propagates at a right angle to the incident direction of the incoming or S polarized light A, as shown in FIG. 1.

FIG. 2 shows the polarized beam splitter of FIG. 1 employed as an optical pickup (recorded data reader) in an optical disk player. As shown, the track on a disk 4 carries recorded data which can be read with a laser beam focused thereon.

A beam of diffused light emitted from a laser diode 5 is shifted to a parallel light beam by a collimator lens 6 and directed to a prism 1. The incoming beam A which is an S polarized light passes through the prism 1 and a quarter wave plate 2 and reflects on a tracking control mirror 7. A reflected beam is then converged by an objective lens 8 to focus onto the disk 4.

The track of the disk 4 exhibits different factors of reflectance depending on recorded data forms (for example, 1 or 0 in binary). This allows the laser beam to read a desired data through focusing onto a target point on the track and detecting its reflected beam. The tracking control mirror 7 is arranged to rotate for correctly tracking the laser beam along the track and is actuated by a tracking servo means (not shown) for tracking control.

The return beam B reflected by the disk 4 is shifted back by the objective lens 8 to a parallel light which is then directed by the tracking control mirror 7 to pass across the quarter wave plate 2 to the prism 1. The return beam B which is converted to a P polarized light by the quarter wave plate 2 is thus reflected on a dielectric layer 1c of the prism to propagate at a right angle to the direction of the incoming beam A.

The return beam B emerging from the prism 1 is then converted into an electrical signal by an optical sensor (not shown), e.g. a photo diode, having a photo electric converting element, from which the data recorded on the disk 4 is recovered.

The disadvantages of such a prior art optical pickup are however that its production and the assembly and adjustment of its components are troublesome and that its three-dimensional construction in principle is hardly reduced in size and particularly, in thickness. Also, the mirror for tracking control has to be mechanically actuated causing difficulties in the tracking at high speed.

OBJECT AND SUMMARY OF THE INVENTION

It is an object of the present invention to provide recorded data reader which requires no troublesome assembly nor adjustment, has a substantially two-dimensional construction for ease of miniaturization, and provides high speed tracking with the use of a wave motion technique.

A recorded data reader according to the present invention comprises a light source for emitting a beam of linearly polarized light, a lens for converging the emitted beam onto a recording medium, a transmitting and separating means for transmitting the emitted beam to the converging lens and separating a return beam emerged from the converging lens from the emitted beam, and a photosensitive means for receiving the return beam separated by the transmitting and separating means.

The transmitting and separating means consists mainly of a polarized beam splitter provided with an interface between a titanium diffused region formed by diffusing of titanium into a layer of a substrate of lithium niobate and a proton exchanged region formed by treating a region of the titanium diffused substrate layer for proton exchange, a collimator lens arranged in the substrate for converting the emitted beam into a parallel light, and a surface wave electrode for transmitting the parallel light to the polarized beam splitter while diffracting the same.

The converging lens is disposed in the other side of the polarized beam splitter where the collimator lens in the substrate is absent.

The following operation is carried out in the recorded data reader of the present invention.

A beam of light emitted from the light source is converted by the collimator lens to a parallel ray which is in turn diffracted by means of an elastic surface wave from the surface wave electrode. Hence, the parallel ray is refracted at the interface toward the converging lens where it is converged onto the surface of a recording medium.

A return beam reflected from the recording medium is then reflected at the interface to propagate in a different direction from the propagation of the incoming beam and, finally, enters the photosensitive means.

BRIEF DESCRIPTION OF THE DRAWINGS

FIGS. 4A and 4B are cross sectional views of the polarized beam splitter illustrated in FIG. 3E;

FIG. 5 is a view showing the polarized beam splitter of an embodiment of the present invention in action.

DETAILED DESCRIPTION OF THE PREFERRED EMBODIMENTS

Preferred embodiments of the present invention will be described in more detail referring to FIGS. 3A to 6B.

FIGS. 3A to 3E illustrate the procedure of fabricating polarized beam splitter according to the present invention.

Figure 1:
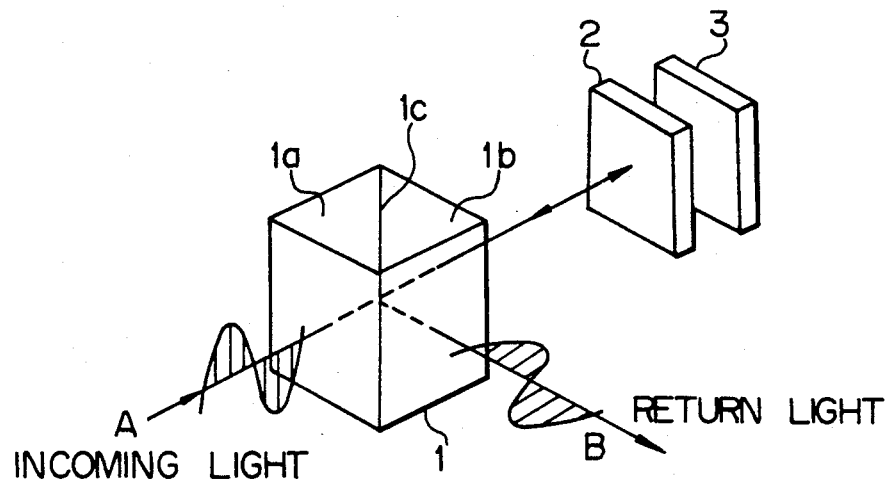
FIG. 1 is a schematic view showing the arrangement of a prior art polarized beam splitter.
Figure 2:
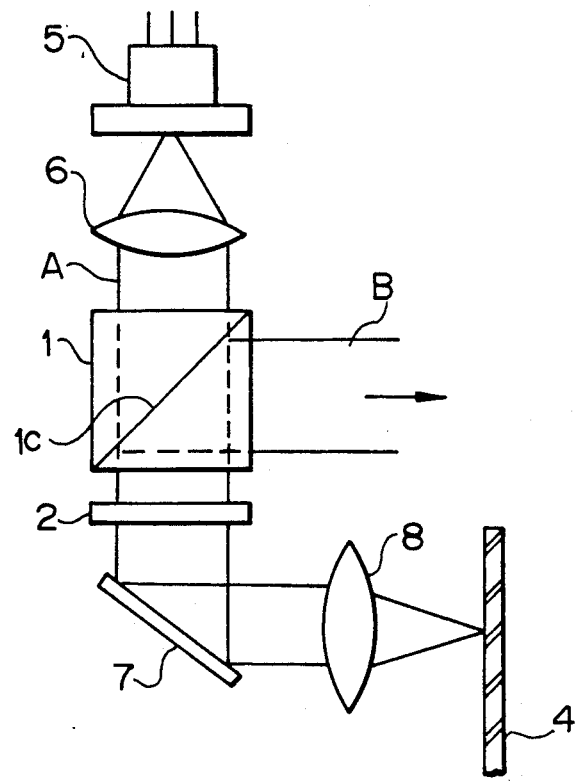
FIG. 2 illustrates an optical pickup using the prior art polarized beam splitter.
Figure 3A:
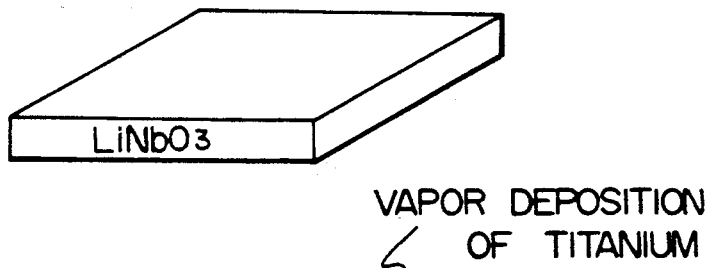
FIGS. 3A to 3E are views showing a procedure of fabricating a polarized beam splitter of the present invention.

FIG. 3A shows a Y-cut lithium niobate (LiNbO$_3$) substrate (referred to as a substrate hereinafter) capable of producing ferroelectricity.

Figure 3B:
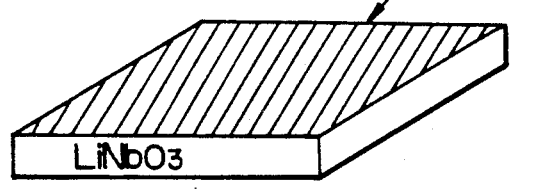
Figure 3C:
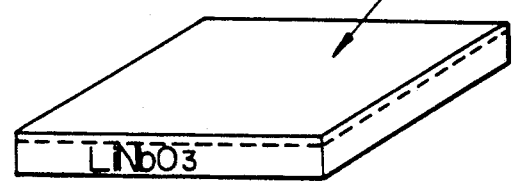

One side of the substrate is mirror polished forming a polished surface across which a light path extends. FIG. 3B shows the polished surface of the substrate on which an amount of titanium is vapor deposited by sputtering or like process developing a titanium thin layer of about 200 angstrom thickness. FIG. 3C shows a step in which a titanium diffused layer is developed through heating up the titanium thin layer to about 1000° C. for diffusion of titanium into the inside of the substrate.

Figure 3D:
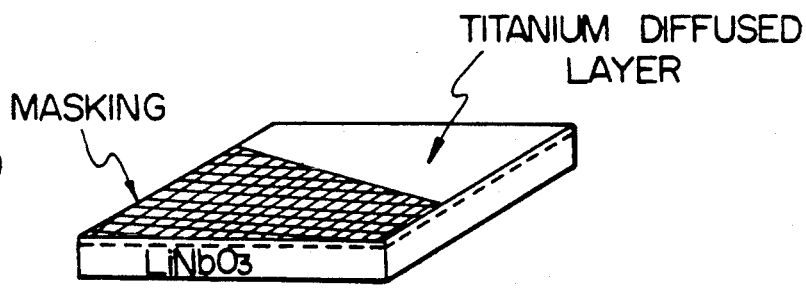
Figure 3E:
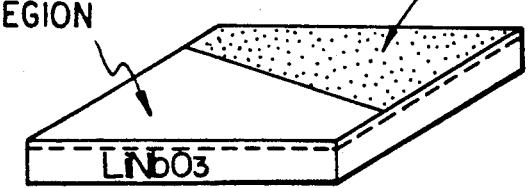

Then, a region of the titanium diffused layer is masked on top with an acid-resisting metallic material, e.g. tantalum, as shown in FIG. 3D, and the remaining unmasked region is treated with a benzoic or pyrophosphoric acid for proton exchange. FIG. 3E illustrates the substrate surface divided by an interface into the existing titanium diffused region (referred to as a titanium region hereinafter) where the masking allowed no proton exchange and the newly developed region (referred to as a proton exchanged region) where the proton exchange was executed after titanium diffusion.

The titanium region, the proton exchanged region, and the substrate exhibit different refractive indices to a normal and an abnormal ray when the rays of light are propagated approximately along the X axis or on the X-Y plane. In the embodiment, the refractive indices, $n_o$ and $n_e$, of the titanium region are 2.29 to the normal ray and 2.21 to the abnormal ray. Similarly, the proton exchanged region exhibits $n_o = 2.246$ and $n_e = 2.33$. The substrate exhibits $n_o = 2.286$ and $n_e = 2.20$.

FIGS. 4A and 4B are cross sectional views of a polarized beam splitter 9 produced by the procedure shown in FIGS. 3A to 3E. As shown, the diffused layer of a substrate 9d is divided by an interface 9c into a proton exchange region 9a and a titanium region 9b.

The polarized beam splitter 9 is more specifically illustrated in FIG. 5 as viewed from its diffused thin film side. Its substrate (not shown) is made of Y-cut lithium niobate for propagation in the X direction, as above described. The lithium niobate material contains a less amount of spurious substances (unwanted components) which are undesired in the polarized beam splitter.

As shown in FIG. 5, a beam A of S polarized (TE mode) light enters the proton exchanged region 9a at an incident angle $\theta_1$ to the interface 9c of the polarized beam splitter 9. The incoming beam A is refracted at the interface 9c to the X direction and transmitted through the titanium region 9b. The angle of a refracted beam to the interface 9c is designated as $\theta_2$.

The refracted beam from the titanium region 9b passes across a quarter wave plate 2 where it is shifted from linearly to circularly polarized wave and then, reflected on a mirror 3. The reflected beam passes again the quarter wave plate 2 where its polarizing direction is shifted 90° from that of the original linearly polarized wave just after the titanium region 9b. More specifically, the reflected beam becomes a P polarized light which is returned to the titanium region 9b. As the return beam B is directed from a high refractive index side across the interface 9c to a low refractive side, the angle $\theta_2$ should be determined for total reflection of the return beam B by:

$$0 < \theta_2 \leq \cos^{-1}(n_oP/n_oT).$$

The refractive indices of the proton exchange region 9a and the titanium region 9b to a normal ray are:

$$n_oP = 2.246 \text{ and } n_oT = 2.29.$$

Also, the same to an abnormal ray are:

$$n_eP = 2.33 \text{ and } n_eT = 2.21$$

Hence, the angle $\theta_2$ of total reflection angle or refraction is expressed as:

$$0 < \theta_2 \leq 11.2°$$

The angle $\theta_2$ also falls between the interface 9c and the X direction representing a displacement angle of the interface 9c to the light path of both the refracted and return beams across the polarized beam splitter 9. Then, the incident angle $\theta_1$ is expressed as:

$$18.5° < \theta_1 \leq 21.5°$$

The value of 18.5 is obtained on condition that $\theta_2$ is 0.

Accordingly, through determining the incident angle $\theta_1$ and the displacement angle on the polarized beam splitter 9 to appropriate degrees, the incoming beam A can be transmitted through and the return beam B can be directed by total reflection in a different direction from the propagation of the incoming beam A.

Figure 6A:
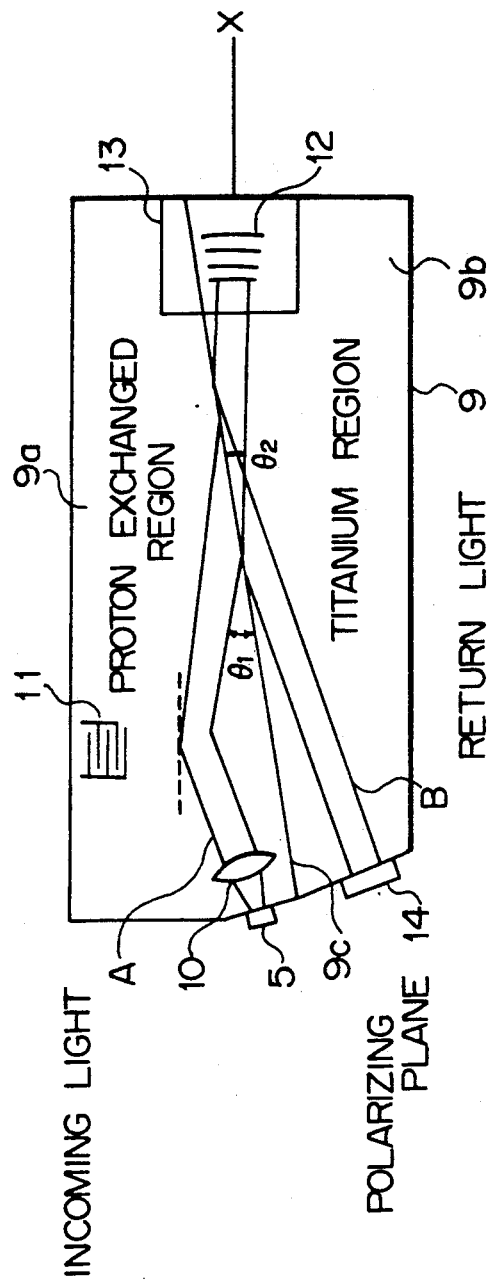
FIGS. 6A and 6B are views of an optical pickup using the polarized beam splitter of the present invention.
Figure 6B:
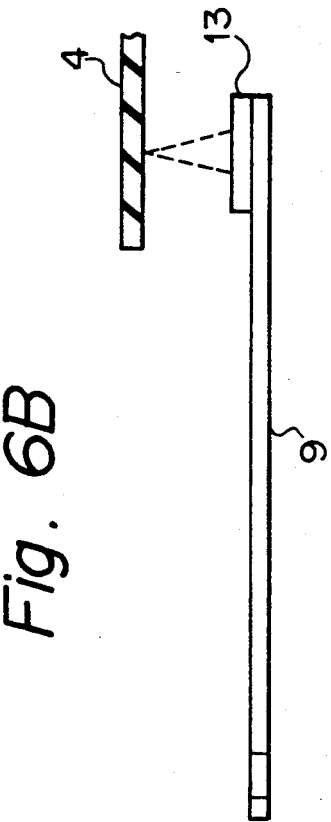

FIG. 6A shows an optical pickup 15 incorporating a polarized beam splitter 9 which comprises a collimator lens 10 and a surface wave electrode 11 both arranged in the proton exchanged region side thereof, a grating lens 12 arranged in the titanium region side thereof for acting as an objective lens, a laser diode 5 arranged in the proton exchanged region side, a quarter wave plate 13 arranged above the grating lens 12, and a photo sensor 14 fixedly mounted onto a side of the titanium region. FIG. 6B illustrates the positional relation between the disk 4 and the optical pickup 15 viewed in cross section extending in the X direction.

As shown in FIG. 6A, a beam A of S polarized light transmitted from the laser diode 5 to the proton exchanged region 9a is converted by the collimator lens 10 into a parallel light. The surface wave electrode 11 is energized with a tracking control signal supplied from an external signal source (not shown). The tracking control signal triggers the emission of an elastic surface wave from the surface wave electrode 11. The parallel light emerged from the collimator lens 10 is converted by Bragg diffraction with the elastic surface wave to a beam of diffracted light which falls on the interface 9c at the incident angle of $\theta_1$.

The diffracted light is then refracted on the interface 9c and a refracted beam propagates across the titanium region 9b in the X direction. The refracted beam is converged by the grating lens 12 and passes the quarter wave plate 13 to the disk 4. A return beam B reflected from the disk 4 and carrying data retrieved from the disk 4 is propagated through the quarter wave plate 13 and then, converted back by the grating lens 12 into a parallel light.

The return beam B which is a P polarized light is reflected on the interface 9c to the photo sensor 14 where it is converted into an electrical signal for translating the data.

As understood, the parallel light emerged from the collimator 10 is diffracted by means of the elastic surface wave or tracking control signal. Accordingly, through varying the angle of diffraction in response to the tracking error information of the tracking control signal, the focusing of a laser beam through the grating 12 onto the disk 4 can be controlled for execution of high speed tracking operation.

Although the laser diode 5, quarter wave plate 13, and photo sensor 14 of the foregoing embodiment are fixedly mounted to the polarized beam splitter 9, they may be formed integral with the polarized beam splitter 9 allowing the optical pickup 15 to be one single unit.

Also, the quarter wave plate 13 is not limited to quartz or double refractive crystalline material and can be formed from any material which can rotate the plane of polarization of a linearly polarized light through 90°.

As set forth above, the recorded data reader of the present invention is provided with a polarized beam splitter incorporating the interface between a titanium diffused region formed by diffusion of titanium into the lithium niobate substrate and a proton exchanged region formed by treating one region of the titanium diffused layer for proton exchange. Also, a collimator lens, an objective lens, and a surface wave electrode are arranged on the same substrate.

The polarized beam splitter further has a light source and a photo sensor fixedly mounted thereto.

In operation, a beam of incoming light emitted from the light source is converted by the collimator lens to a parallel light which is in turn diffracted by means of an elastic surface wave from the surface wave electrode. A diffracted beam is then refracted on the interface to the objective lens where it is converged to focus on a recording medium.

A return beam reflected from the recording medium is reflected by the interface to propagate in a direction different from the propagation of the incoming light beam and finally, enters the photo sensor.

The recorded data reader has the polarized beam splitter arranged integral with the substrate of thin type thus eliminating troublesome assembly and adjustment jobs. Also, its construction has a largely 2-dimensional arrangement which can easily be reduced in the size.

The primary optical components including a polarized beam splitter and lenses are integrally arranged on the same substrate so that the recorded data reader can be fabricated in the form of an optical integrated circuit.

Furthermore, the tracking is controlled with the use of an elastic surface wave and thus, the recorded data reader will provide higher speed tracking operation as compared with a conventional mechanically controlled reader.

Although a beam of light is propagated approximately along the X direction or on the X-Y plane of the Y-cut $LiNbO_3$ substrate in the embodiments, a Z-cut $LiNbO_3$ substrate will be employed with equal success in which a light beam is propagated on the X-Z plane. As the result, if the incoming beam A shown in FIG. 5 is in TM mode, the outgoing beam B will be given in TE mode as a desired output of a polarized beam splitter.

What is claimed is:

1. A recorded data reader comprising:
    a light source for emitting a beam of linearly polarized light having a direction of propagation;
    a lens for converging said emitted beam onto a recording medium;
    transmitting and separating means for transmitting said emitted beam to said converging lens and separating a return beam emerging from said converging lens from said emitted beam; and
    photosensitive means for receiving the return beam separated by said transmitting and separating means,
    wherein said transmitting and separating means comprises a substrate of lithium niobate, a layer of said substrate having titanium diffused therein, said layer comprising a titanium diffused region and a proton exchanged region with an interface defined between said titanium diffused region and said proton exchanged region, for forming a polarized beam splitter; a collimator lens arranged in the substrate for converting said emitted beam into a parallel light; and a surface wave electrode for transmitting the parallel light to the polarized beam splitter while diffracting the same;
    and wherein said converging lens is positioned downstream from said interface with respect to said direction of propagation of said emitted beam.

2. A recorded data reader according to claim 1, wherein said converging lens is an objective lens.

3. A recorded data reader according to claim 1, wherein said converging lens is a grating lens.

4. A recorded data reader according to claim 1, further comprising a quarter wave plate disposed downstream from said interface with respect to said direction of propagation of said emitted beam.

5. A recorded data reader according to claim 4, wherein said quarter wave plate comprises quartz.

6. A recorded data reader according to claim 4, wherein said quarter wave plate comprises double refractive material.

7. A recorded data reader according to claim 1, wherein said light source and said photosensitive means are fixedly mounted to an exterior face of said substrate.

8. A recorded data reader according to claim 4, wherein said light source, said quarter wave plate, and said photosensitive means are fixedly mounted to said substrate.

9. A recorded data reader according to claim 1, wherein said light source and said photosensitive means are integral with said substrate.

10. A recorded data reader according to claim 4, wherein said quarter wave plate is integral with said substrate.

11. A recorded data reader according to claim 1, wherein said proton exchanged region is formed by:
    masking a region of said titanium diffused layer with acid-resisting material; and
    treating a remaining, unmasked region with acid for proton exchange.

12. A recorded data reader according to claim 1, wherein said proton exchanged region is constituted by an acid-treated region of said layer of said substrate.

* * * * *